United States Patent
Gault et al.

(10) Patent No.: US 12,483,745 B2
(45) Date of Patent: Nov. 25, 2025

(54) RENDERING MEDIA STREAMS

(71) Applicant: AIRMONT DATACAST SAS, Ermont (FR)

(72) Inventors: Jean-François Gault, Ermont (FR); Sebastien Le Roy, Ermont (FR); Damien Jondeau, Ermont (FR); François Goudal, Ermont (FR)

(73) Assignee: AIRMONT DATACAST SAS, Ermont (FR)

( * ) Notice: Subject to any disclaimer, the term of this patent is extended or adjusted under 35 U.S.C. 154(b) by 0 days.

(21) Appl. No.: 18/721,928

(22) PCT Filed: Dec. 8, 2022

(86) PCT No.: PCT/EP2022/084993
§ 371 (c)(1),
(2) Date: Jun. 20, 2024

(87) PCT Pub. No.: WO2023/117465
PCT Pub. Date: Jun. 29, 2023

(65) Prior Publication Data
US 2025/0056083 A1 Feb. 13, 2025

(30) Foreign Application Priority Data

Dec. 22, 2021 (EP) .................................. 21217185

(51) Int. Cl.
*H04N 21/431* (2011.01)
*H04N 21/434* (2011.01)

(52) U.S. Cl.
CPC ....... *H04N 21/431* (2013.01); *H04N 21/4341* (2013.01)

(58) Field of Classification Search
CPC ........... H04N 21/233; H04N 21/23463; H04N 21/2347; H04N 21/2365; H04N 21/2665;
(Continued)

(56) References Cited

U.S. PATENT DOCUMENTS 5,446,919 A * 8/1995 Wilkins ............... H04N 21/812
725/35
5,515,511 A * 5/1996 Nguyen .............. H04L 12/2856
725/74
(Continued)

FOREIGN PATENT DOCUMENTS

WO 2013185238 A1 12/2013

OTHER PUBLICATIONS

Kolar, Vinay, et al., "CTCV: A Protocol for Coordinated Transport of Correlated Video in Smart Camera Networks", 2016 IEEE 24th International Conference on Network Protocols (ICNP), IEEE, Nov. 8, 2016, pp. 1-10.
(Continued)

*Primary Examiner* — Michael B. Pierorazio
(74) *Attorney, Agent, or Firm* — DINSMORE & SHOHL LLP

(57) ABSTRACT

Approaches for rendering video stream and audio corresponding to a media stream from amongst a plurality of media streams are described. In one example, a plurality of media streams comprising a video stream and an audio may be obtained at a media processing system, which may then be combined to generate a mosaiced media stream. The mosaiced media stream may then be encoded to obtain an encoded stream. Thereafter, the encoded stream may be caused to transmit to a receiver system. The receiver system, on receiving the encoded stream, may decode the encoded stream to obtain the mosaiced media stream. Thereafter, the mosaiced media stream may be deconstructed to retrieve each of the plurality of media streams. Thereafter, video stream and audio corresponding to one of the media streams may be caused to render on a video display system.

18 Claims, 11 Drawing Sheets

(58) Field of Classification Search
CPC ......... H04N 21/4122; H04N 21/41422; H04N 21/431; H04N 21/4314; H04N 21/4341; H04N 21/4347; H04N 21/439; H04N 21/441; H04N 21/4821; H04N 21/64322
See application file for complete search history.

(56) References Cited

U.S. PATENT DOCUMENTS

| | | | | |
|---|---|---|---|---|
| 5,629,733 A * | 5/1997 | Youman | H04N 7/0884 | 348/E7.071 |
| 5,671,411 A * | 9/1997 | Watts | H04N 21/4828 | 725/43 |
| 5,686,954 A * | 11/1997 | Yoshinobu | H04N 21/47214 | 725/54 |
| 5,699,528 A * | 12/1997 | Hogan | G07F 17/0014 | 705/40 |
| 5,710,884 A * | 1/1998 | Dedrick | H04L 67/306 | 709/217 |
| 5,793,972 A * | 8/1998 | Shane | G06F 16/972 | 709/219 |
| 5,798,785 A * | 8/1998 | Hendricks | H04N 7/173 | 348/E5.103 |
| 5,955,988 A * | 9/1999 | Blonstein | H04N 17/00 | 342/359 |
| 5,988,078 A * | 11/1999 | Levine | H04N 5/782 | 725/35 |
| 6,002,394 A * | 12/1999 | Schein | H04N 7/0884 | 348/E7.024 |
| 6,005,565 A * | 12/1999 | Legall | H04N 21/4622 | 715/969 |
| 6,008,803 A * | 12/1999 | Rowe | H04N 21/482 | 725/40 |
| 6,025,837 A * | 2/2000 | Matthews, III | H04N 21/4782 | 348/E7.071 |
| 6,133,909 A * | 10/2000 | Schein | H04N 21/482 | 715/721 |
| 6,139,177 A * | 10/2000 | Venkatraman | G06F 8/60 | 700/83 |
| 6,268,849 B1 * | 7/2001 | Boyer | H04N 21/4755 | 348/E7.071 |
| 6,388,714 B1 * | 5/2002 | Schein | H04N 21/2543 | 348/E7.024 |
| 6,401,242 B1 * | 6/2002 | Eyer | H04N 21/47 | 725/35 |
| 6,539,545 B1 * | 3/2003 | Dureau | H04N 19/00 | 348/588 |
| 6,621,870 B1 * | 9/2003 | Gordon | H04N 21/4347 | 348/E7.063 |
| 7,028,330 B1 * | 4/2006 | Gaughan | H04N 21/4316 | 348/565 |
| 7,802,284 B2 * | 9/2010 | Kim | H04N 5/607 | 725/38 |
| 8,046,798 B1 * | 10/2011 | Schlack | G06Q 30/02 | 725/9 |
| 8,359,642 B1 * | 1/2013 | Wurtenberger | H04L 63/102 | 726/1 |
| 8,943,537 B2 * | 1/2015 | Hannum | H04N 21/4821 | 725/46 |
| 2002/0019817 A1 * | 2/2002 | Matsui | G06F 21/10 | |
| 2002/0099657 A1 * | 7/2002 | Black | G07F 19/20 | 705/43 |
| 2004/0117831 A1 * | 6/2004 | Ellis | H04N 21/812 | 348/E7.071 |
| 2005/0028208 A1 * | 2/2005 | Ellis | H04N 21/4755 | 348/E7.071 |
| 2005/0155057 A1 * | 7/2005 | Wei | H04N 21/25891 | 725/38 |
| 2007/0204297 A1 * | 8/2007 | Gonzalez | H04N 21/4622 | 725/40 |
| 2007/0204302 A1 * | 8/2007 | Calzone | H04N 21/4858 | 725/41 |
| 2008/0222127 A1 * | 9/2008 | Bergin | G06F 16/9017 | 707/999.005 |
| 2008/0301746 A1 * | 12/2008 | Wiser | H04N 21/47202 | 725/114 |
| 2008/0301750 A1 * | 12/2008 | Silfvast | H04N 21/43622 | 725/131 |
| 2009/0172728 A1 * | 7/2009 | Shkedi | H04N 21/6175 | 705/14.39 |
| 2009/0248607 A1 * | 10/2009 | Eggink | H04L 67/306 | 709/224 |
| 2010/0031162 A1 * | 2/2010 | Wiser | H04N 21/431 | 715/747 |
| 2010/0031290 A1 * | 2/2010 | Hua | H04N 21/6125 | 725/39 |
| 2010/0325666 A1 * | 12/2010 | Wiser | H04N 21/631 | 725/44 |
| 2011/0202270 A1 * | 8/2011 | Sharma | G06Q 30/02 | 705/14.4 |
| 2012/0072946 A1 * | 3/2012 | Cranman | H04N 21/4882 | 725/28 |
| 2012/0096491 A1 * | 4/2012 | Shkedi | H04N 21/6175 | 725/35 |
| 2012/0159528 A1 * | 6/2012 | Toney, Jr. | H04H 60/33 | 725/14 |
| 2013/0152128 A1 * | 6/2013 | Tanna | H04N 21/42204 | 725/39 |
| 2014/0282744 A1 * | 9/2014 | Hardy | H04N 21/482 | 725/61 |
| 2014/0376623 A1 * | 12/2014 | Good | H04N 21/23439 | 375/240.07 |
| 2015/0020095 A1 * | 1/2015 | Yoo | H04N 21/2365 | 725/34 |
| 2015/0020102 A1 * | 1/2015 | Yoo | H04N 21/234363 | 725/41 |
| 2015/0067754 A1 * | 3/2015 | Wiser | H04N 21/631 | 725/120 |
| 2015/0181132 A1 | 6/2015 | Kummer | | |
| 2015/0215497 A1 * | 7/2015 | Zhang | H04N 21/6336 | 348/521 |
| 2015/0312618 A1 | 10/2015 | McElhatten | | |
| 2019/0253742 A1 | 8/2019 | Garten | | |
| 2020/0169767 A1 | 5/2020 | Tandon | | |

OTHER PUBLICATIONS

International Search Report and Written Opinion received in priority PCT/EP2022/084993, Jan. 19, 2023, pp. 1-11.

* cited by examiner

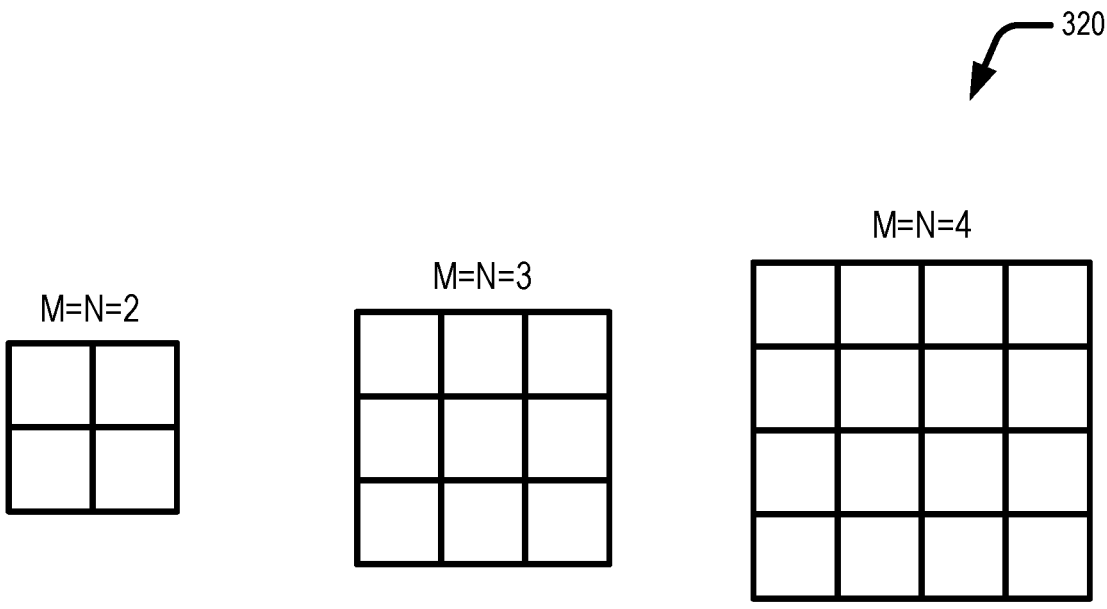
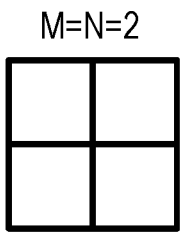
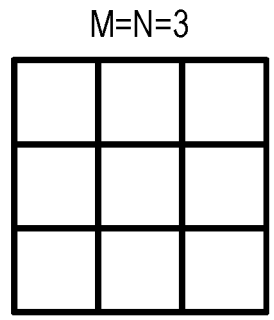
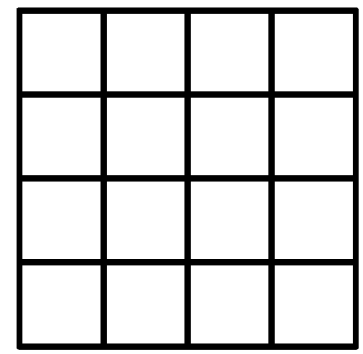
3(A)  3(B)  3(C)
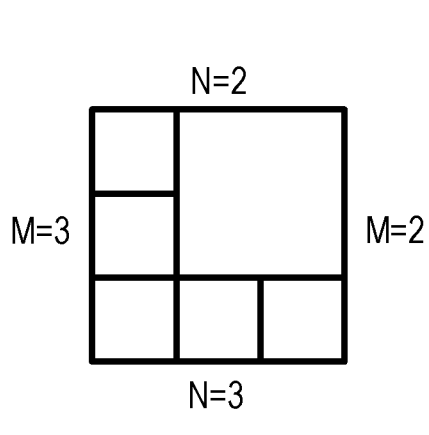
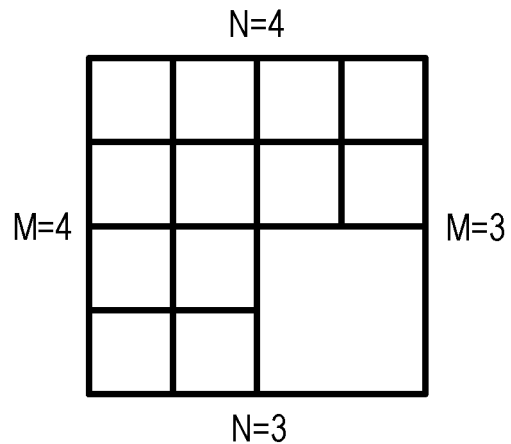
3(D)  3(E)
FIG. 3A-3E

RENDERING MEDIA STREAMS

CROSS REFERENCE TO RELATED APPLICATIONS

This application is a § 371 U.S. National Stage Application of International Application No. PCT/EP2022/084993, filed Dec. 8, 2022, and claims priority to EP 21217185.4, filed Dec. 22, 2021, the entire contents of which are incorporated herein by reference.

BACKGROUND

Different media contents from different media sources may be rendered on a video display system. For example, each of the media sources may generate a media stream corresponding to its respective media content, which may include a video stream and an audio. Each of the generated media streams may then be encoded separately at each of the media sources, and all the encoded media streams may then be transmitted to the video display system. The video display system may decode the media streams to obtain and render the corresponding media contents.

BRIEF DESCRIPTION OF DRAWINGS

The following detailed description references the drawings, wherein:

FIGS. 3A-3E depict example mosaiced media stream grids generated by the example media processing system, as per an example of the present subject matter;

Figure 1:
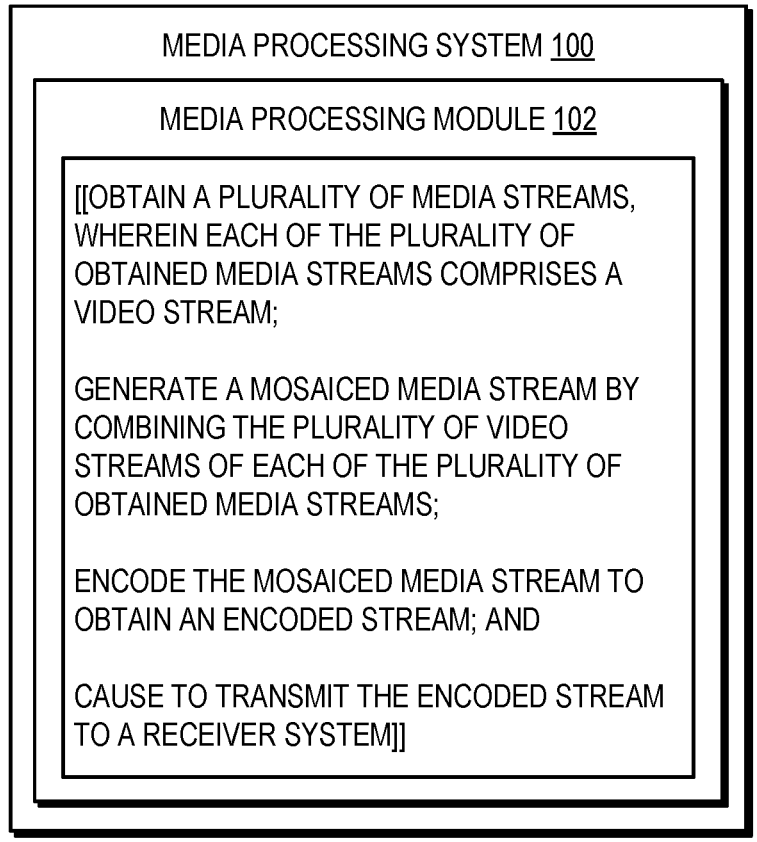
FIG. 1 is a block diagram of an example media processing system, as per an example of the present subject matter.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

Various media sources may provide multiple media contents to be rendered on a display device. For example, each of the media sources may generate its respective media stream, which may include a video stream and an audio, corresponding to its media content. Each of the generated media streams may then be encoded independently at each of the media sources, and each of the encoded stream may then be combined to be transmitted to a video display system. Once obtained at the video display system, the encoded media streams may then be decoded to obtain the media content corresponding to each of the media devices. Thereafter, the media content, which may include the video stream and the audio, may then be rendered on a display device.

In the aforementioned scenario, encoding each of the media streams independently at the respective media sources may entail a separate encoder or encoding process at each of the media sources, which may be computationally expensive. Further, using a separate encoder or encoding process at each of the media source may also be economically expensive. Such computational resource requirement issue may further be aggravated in cases where a large number of media sources may provide the media contents to the video display system and a separate encoder or encoding process may be used at each of the media sources.

It may also be the case that the different media sources which may be providing media contents may implement different encoding schemes before transmitting the media streams to the video display system. As would be further understood, the different media streams may also have to be encapsulated via a transport protocol, such as MPEG-DASH, HLS, SRT, etc. to be transmitted to the video display system.

As a result, not only this may increase the computational overhead at the media sources due to separate encoder at each of the media sources, but may also require the video display system to implement different decoding schemes to decode the different media streams. Even further, the different transport protocols may also increase the bandwidth consumption of the media streams as each of the transport protocol, during encapsulation of the media stream, adds an overhead on the transmitted media streams. This may further increase the computational cost and it may be inefficient to implement such encoding-decoding techniques.

Approaches for rendering video stream and audio corresponding to a media stream from amongst a plurality of media streams on a video display system are described. In an example, a plurality of media streams may be obtained at a media processing system. The plurality of media streams may be obtained from different media sources, and each of the plurality of media streams may include a video stream and an audio corresponding to different media contents. The plurality of video streams may then be combined to generate a mosaiced media stream. The mosaiced media stream may then be integrated with the plurality of audios to obtain an audio integrated mosaiced media stream. The audio integrated mosaiced media stream may then be encoded to obtain an encoded stream. Thereafter, the encoded stream may be transmitted to a receiver system via a media processing server.

In an example, the receiver system may receive the encoded stream from the media processing system. The encoded stream may then be decoded to obtain the audio integrated mosaiced media stream. As described previously, the audio integrated mosaiced media stream includes plurality of audios integrated with the mosaiced media stream. Further, the mosaiced media stream, as described previously, may include a plurality of video stream of each of the plurality of media streams. The plurality of audios and the mosaiced media stream may then be extracted from the audio integrated mosaiced media stream. The mosaiced media stream may then be deconstructed to retrieve the plurality of video streams of each of the plurality of media streams, and the video stream and audio corresponding to the one of the retrieved media streams may then be rendered on a video display system.

In another example, the plurality of media streams, at the media processing system, may be provided by respective users through their user devices. The user may provide one of a user name and a unique identifier along with the media stream while providing the respective media stream. In such cases, upon receiving the encoded stream at the receiver system, the encoded stream may then be decoded to obtain the audio integrated mosaiced media stream. Thereafter, user authentication may be carried out. In response to the user providing the username and the unique identifier, a corresponding media stream may be identified from amongst the plurality of media streams. The audio integrated mosaiced media stream may then be filtered to obtain the corresponding identified media stream from amongst the plurality of media streams, and the video stream and matching audio corresponding to the identified media stream may then be rendered on a display device.

As would be appreciated, the aforementioned techniques facilitate in combining the plurality of media streams to generate a mosaiced media stream. The plurality of audios may also be integrated within the mosaiced media stream to obtain an audio integrated mosaiced media stream, thereby eliminating the need for separately transmitting the audio of each of the media streams. The audio integrated mosaiced media stream may then be encoded, thereby further eliminating the need for independently encoding each of the plurality of media streams and decreasing the computational resources requirement. Having a single video stream may also decrease the overhead of the transport protocol, thereby further decreasing the bandwidth used by the media streams.

Further, in cases where the media streams are provided by respective users, the approaches of the present subject matter may securely render only the corresponding media content on the display device, upon authenticating the user, thereby ensuring privacy in rendering media content on display devices where a centralized decoding and processing may be performed on the media streams.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the example computing devices are implemented are explained in detail with respect to FIGS. 1-10. While aspects of described computing devices can be implemented in any number of different electronic devices, environments, and/or implementations, the examples are described in the context of the following example system(s). It is to be noted that drawings of the present subject matter shown here are for illustrative purposes and are not to be construed as limiting the scope of the subject matter claimed.

FIG. 1 illustrates a block diagram of a media processing system 100, as per an example of the present subject matter. The media processing system 100 may be any computing device capable of receiving, processing, and transmitting data. In an example, the media processing system 100 may be communicatively coupled with a plurality of media sources (not depicted in FIG. 1) and a receiver system (not depicted in FIG. 1).

As would be understood, media sources may be referred to as media storage devices which may include a repository or a plurality of repositories of media contents. Examples of such media sources may include, but are not limited to, a settop box, an IP-based media device, a TV satellite box, an IPTV box, an external hard drive, a flash drive, a mobile phone, a laptop, a portable PC, or any other device capable of generating a media stream corresponding to its media content. The media processing system 100 may further include a media processing module 102.

In operation, the media processing module 102 may obtain a plurality of media streams from the plurality of media sources. Each of the plurality of obtained media streams may include a video stream. Upon obtaining the plurality of media streams, the media processing module 102 may generate a mosaiced media stream by combining the plurality of video streams of each of the plurality of obtained media streams. Thereafter, the media processing module 102 may encode the mosaiced media stream to obtain an encoded stream.

The media processing module 102 may then cause the encoded stream to be transmitted to the receiver system. The manner in which the media processing system 100 and the receiver system render media corresponding to a media stream from amongst a plurality of media streams is described in further details in conjunction with FIGS. 2-4.

Figure 2:
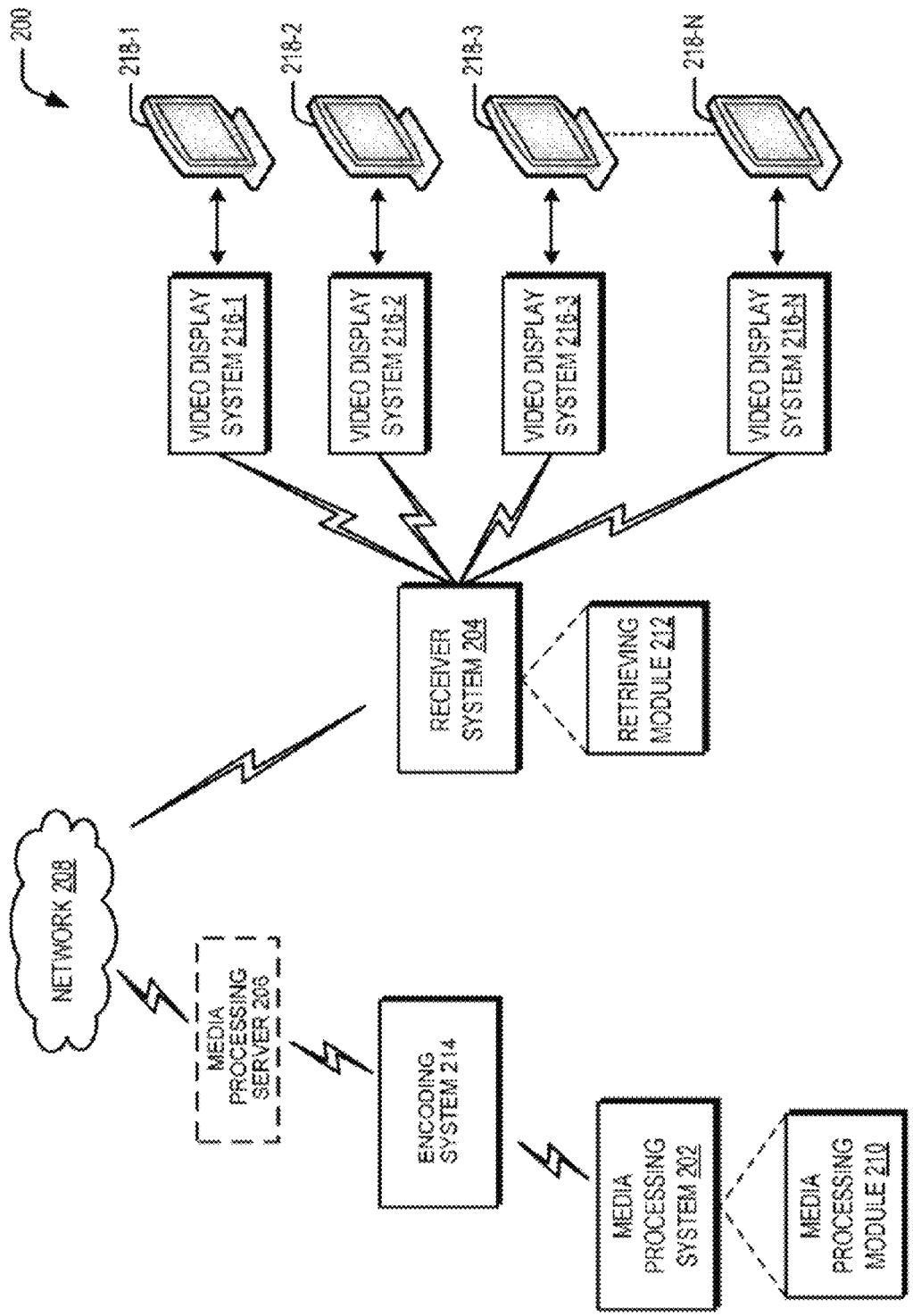
FIG. 2 illustrates an example network environment with an example media processing system and an example receiver system, as per an example of the present subject matter.

FIG. 2 illustrates an example network environment 200 with an example media processing system 202 and an example receiver system 204 for rendering video stream and audio corresponding to a media stream from amongst a plurality of media streams on a video display system, as per an example of the present subject matter. The media processing system 202 and the receiver system 204 may be any computing devices which may be capable of receiving, processing, and transmitting the data. In one example, the media processing system 202 may be implemented as media processing system 100 as described in FIG. 1.

The media processing system 202 may be in communication with the receiver system 204 and a media processing server 206 over a network 208. The network 208 may be a wireless or a wired network, or a combination thereof. Further, the network 208 may be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, personal communications service (PCS) network, Timedivision multiple access (TDMA) network, Code-Division Multiple Access (CDMA) network, next-generation network (NGN), public switched telephone network (PSTN), and Integrated Services Digital Network (ISDN). Depending on the terminology, the network 208 may include various network entities, such as gateways and routers, however, such details have been omitted to maintain the brevity of the description.

The media processing system 202 may further include a media processing module 210. In one example, the media processing module 210 may be implemented as media processing module 102 described in FIG. 1. The receiver system 204 may further include a retrieving module 212.

As described previously, the media processing system 202 may be coupled to and obtain media streams from a plurality of media sources (not depicted in FIG. 2). The media sources may be referred to as media storage devices which may include a repository or a plurality of repositories of media contents. Examples of such media sources may include, but are not limited to, a set-top box, an IP-based media device, a TV satellite box, an IPTV box, an external hard drive, a flash drive, a mobile phone, a laptop, a portable PC, or any other device capable of generating a media stream corresponding to its media content. Such media sources may be communicatively coupled to the media processing system 202 through a wired (e.g., Local Area Network, i.e., LAN, HDMI cable, USB cable) connection, wireless connection (e.g., Bluetooth®, WiFi, Near Field Communication (NFC)), or any other technique known to a person skilled in the art.

In operation, the media processing module 210 may obtain a plurality of media streams from the plurality of media sources. Each of the plurality of obtained media streams may include a video stream and an audio. In one example, each of the plurality of media streams obtained from the media sources may include a unique identifier of the media content corresponding to each of the media stream. In another example, the unique identifier of the media content corresponding to each of the media stream may be identically assigned to the video stream and audio of the respective media stream. In yet another example, the unique identifier may be a 'title' of the media content corresponding to the media stream. In yet another example, the unique identifier may be a unique alphanumeric code assigned to each of the media streams obtained at the media processing system 202. However, it may be noted that the aforementioned examples of the unique identifier are only illustrative, and should not be construed to limit the scope of the present subject matter in any manner. Any other unique identifier of each of the media stream may also be included with the media stream without deviating from the scope of the present subject matter. It may also be noted that any number of media sources may be coupled to the media processing system 202 and the media processing module 210 may obtain any number of media streams from the respective media sources.

Continuing with the present example, upon obtaining the plurality of media streams, the media processing module 210 may generate a mosaiced media stream by combining the plurality of video streams of each of the plurality of obtained media streams. In one example, the media processing module 210 may extract image frames of each of the plurality of video streams, and may form the mosaiced media stream by juxtaposition of all image frames of each of the plurality of video streams.

Thereafter, the media processing module 210 may integrate the plurality of audios of each of the plurality of media streams with the mosaiced media stream to obtain an audio integrated mosaiced media stream. In one example, the media processing module 210 may integrate the plurality of audios of each of the plurality of obtained media streams in an audio channel. In another example, the audio channel may be obtained based on Advanced Audio Coding Standard. However, it may be noted that any other technique or standard may be used for integrating the plurality of audios with the mosaiced media stream without deviating from the scope of the present subject matter.

Continuing further, thereafter, the media processing module 210 may encode the audio integrated mosaiced media stream to obtain an encoded stream. In one example, an encoding system 214 may be included within the media processing system 202. The encoding system 214 may encode the audio integrated mosaiced media stream, and may provide the encoded stream. In another example, as depicted in FIG. 2, an independent encoding system 214 may be coupled to the media processing system 202. In such cases, the media processing module 210 may provide the audio integrated mosaiced media stream to the encoding system 214, and the encoding system 214 may encode the audio integrated mosaiced media stream to generate an encoded stream. However, it may be noted that any other techniques known to a person skilled in the art may also be used to encode the audio integrated mosaiced media stream without deviating from the scope of the present subject matter.

Thereafter, the media processing module 210 may transmit the encoded stream to the media processing server 206. In one example, the media processing server 206 may be implemented within the media processing system 202. In another example, the media processing server 206 may be implemented as a separate computing device in the network environment 200, and may be in communication with the media processing system 202 and the receiver system 204 over the network 208, as depicted in FIG. 2. In yet another example, the media processing server 206 may be implemented as a centralized server in the network environment 200.

Continuing further, the media processing server 206 may encapsulate the encoded stream via a video transport protocol. Examples of such video transport protocols may include, but are not limited to, HTTP Live Streaming (HLS), Real-Time Streaming Protocol (RTSP), Real-Time Messaging Protocol (RTMP), Secure Reliable Transport (SRT), Dynamic Adaptive Streaming over HTTP (MPEG-DASH), Microsoft Smooth Streaming (MSS), Reliable Internet Stream Transport (RIST), and proprietary video streaming protocols from Zixi, VideoFlow, QVidium, or DVEO. It may be noted that the aforementioned examples of video transport protocol are only illustrative, and should not be construed to limit the scope of the present subject matter in any manner. Any other video transport protocol or any other technique known to a person skilled in the art may also be used by the media processing server 206 to encapsulate the encoded stream without deviating from the scope of the present subject matter.

Continuing with the present example, the media processing server 206 may then transmit the encapsulated encoded stream to the receiver system 204. As described previously, the receiver system 204 may be in communication with the media processing server 206 over the network 208. The receiver system 204 may receive the encoded stream from the media processing server 206. In another example, the media processing server 206 may also encrypt the encoded stream. In yet another example, the encryption may be done using a shared key, negotiate key, private key, public key, or any other method known to a person skilled in the art.

Continuing further, upon receiving the encoded stream, the retrieving module 212 may decode the encoded stream to obtain the audio integrated mosaiced media stream. As described previously, the audio integrated mosaiced media stream may include the plurality of audios integrated with the mosaiced media stream. Further, the mosaiced media stream, as described previously, may include a plurality of video stream of a plurality of media streams. The retrieving module 212 may then extract the plurality of audios and the mosaiced media stream from the audio integrated mosaiced media stream. Thereafter, the retrieving module 212 may then deconstruct the mosaiced media stream to retrieve the plurality of video streams of each of the plurality of media streams.

The receiver system 204 may be further coupled to a plurality of video display system(s) 216-1, 216-2, 216-3, . . . , 216-N (collectively referred to as video display system 216). The video display system 216 may be any display device capable of receiving media stream from the receiver system 204 and rendering video stream and audio corresponding to the received media stream. Each of the plurality of video display systems 216 may further include a coupled display device 218. Examples of such combination of video display system 216 and display device 218 may include, but are not limited to, a television (TV), display monitor, projector, or any other display device. In one example, such video display system 216 and display device 218 may be installed independently at any residential or commercial location, in combination with other electronic devices. In another example, such video display system 216 and display system 218 may be installed in a vehicle such as an automobile or an aircraft in the form of In-Flight Entertainment. It may also be noted that such examples of video display system 216 and display device 218 are only illustrative, and should not be construed to limit the scope of the present subject matter in any manner.

Continuing with the present example, upon retrieval of the plurality of video streams of each of the plurality of media streams, the retrieving module 212 may then match one of the audio from the plurality of extracted audios with a corresponding video stream from the plurality of retrieved video streams. In one example, as described previously, a unique identifier of the media stream may be identically assigned to the video stream and audio of the respective media stream. In such cases, the retrieving module 212 may match the audio with the corresponding video stream based on the unique identifier.

Thereafter, the retrieving module 212 may transmit each of the plurality of media streams to each of the video display systems 216. The video display systems 216 may thereafter, render the video stream and matching audio corresponding to each of the plurality of media stream on the display device 218.

In one example, the user of the display device 218 may then provide a user input to select one of the media content from the plurality of rendered media contents on the display device 218. Based on the received user input, the retrieving module 212 may identify a corresponding media stream from amongst the plurality of media streams. For example, the user may select the unique identifier of one of the rendered media contents. The retrieving module 212, based on the unique identifier, may identify the corresponding media stream, and may then render the video stream and matching audio corresponding to the identified media stream on the display device 218.

It may be noted that, as depicted in FIG. 2, the encoded stream generated by the media processing system 202 may be received at the receiver system 204 on which decoding and other processing functionalities may be performed. The video display systems 216, on which the video stream and matching audio corresponding to the media stream may be rendered, as depicted in FIG. 2, may be coupled to the receiver system 204. However, in another example, the encoded stream generated by the media processing system 202 may directly be received at the video display systems 216. In such cases, the decoding and other processing functionalities may be performed at each of the video display systems 216.

It may be noted that the above examples are provided for sake of explanation only, and that the same are not to be used for limiting the subject matter in any manner. Certain steps and functions may also be implemented differently without deviating from the scope of the present subject matter. Certain such examples are explained further in conjunction with other figures. For example, the manner in which the media processing system 202 and the receiver system 204 render video stream and matching audio corresponding to a media stream from amongst a plurality of media streams on the video display system 216, is described in further detail in conjunction with FIGS. 3-4.

Figure 3:
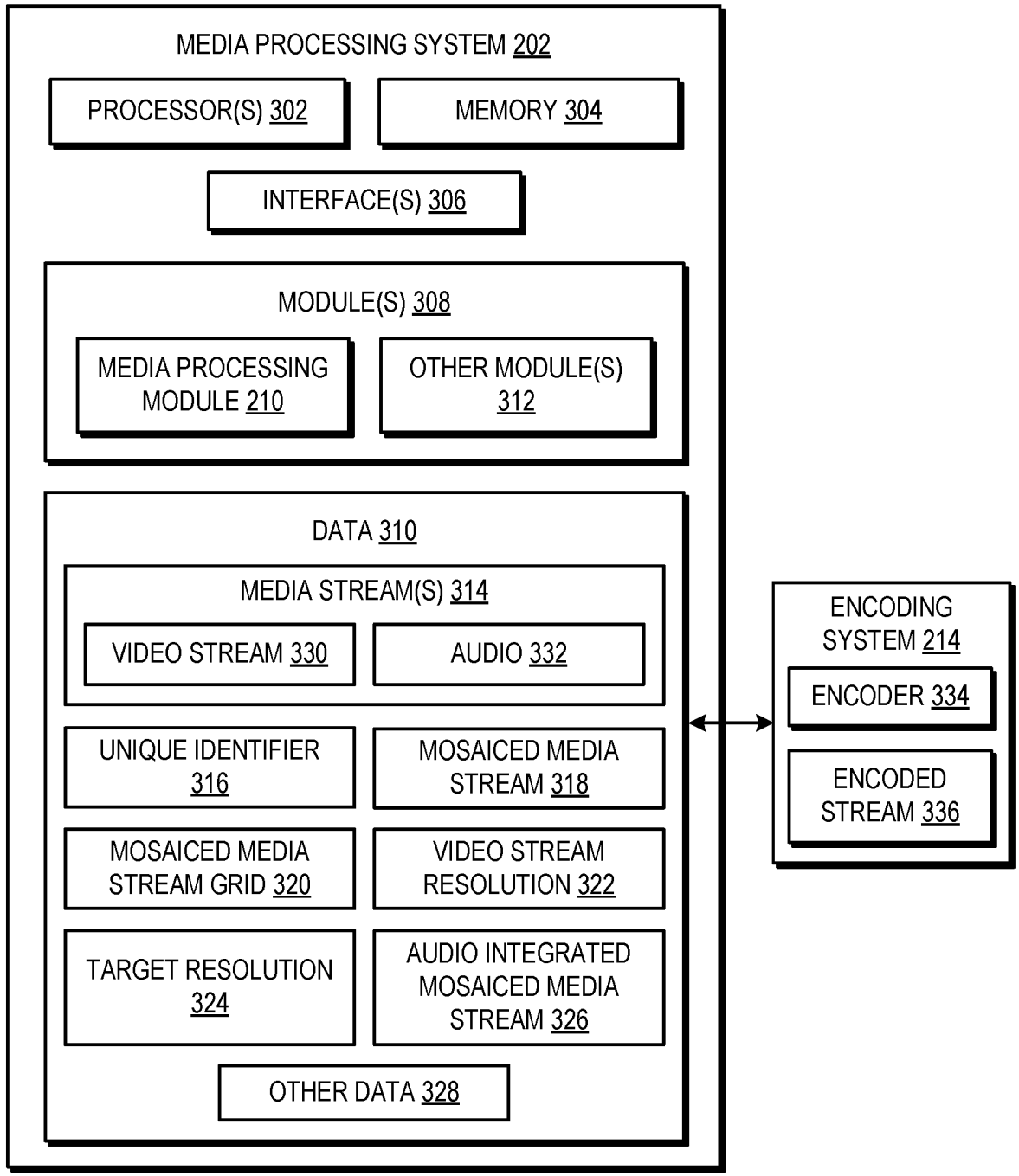
FIG. 3 is a detailed block diagram of an example media processing system, as per an example of the present subject matter.

FIG. 3 is a detailed block diagram of a media processing system, as per an example of the present subject matter. In an example, the media processing system may correspond to the media processing system 202 depicted in FIG. 2. The media processing system 202 may include a processor(s) 302, a memory 304, and an interface(s) 306. The processor(s) 302 may be implemented as signal processor(s), state machine(s), logic circuitries, and/or any other device or component that manipulate signals based on operational instructions.

The memory 304 may store one or more computer-readable instructions. The memory 304 may include any non-transitory computer-readable medium including, for example, volatile memory such as RAM, or non-volatile memory such as EPROM, flash memory, and the like. The interface(s) 306 may include a variety of interfaces, for example, interface for data input and output devices, referred to as I/O devices, storage devices, network devices, and the like, for communicatively associating the media processing system 202 with other entities in the network environment 200 as described in FIG. 2.

The media processing system 202 may further include module(s) 308 and data 310. The module(s) 308 may be implemented as a combination of hardware and programming logic (e.g., programmable instructions) to implement one or more functionalities of the media processing system 202. In one example, the module(s) 308 may include the media processing module 210 and other module(s) 312. The data 310, on the other hand, includes media stream(s) 314, unique identifier 316, mosaiced media stream 318, mosaiced media stream grid 320, video stream resolution 322, target resolution 324, audio integrated mosaiced media stream 326, and other data 328. Further, the other data 328, amongst other things, may serve as a repository for storing data that is processed, or received, or generated as a result of the execution of one or more modules in the module(s) 308. The media stream(s) 314 may further include video stream 330 and audio 332. The media processing system may further be communicatively coupled to a media processing server 206, which in turn may be coupled to an encoding system 214. The encoding system 214 may include an encoder 334 and an encoded stream 336.

In examples described herein, such combinations of hardware and programming may be implemented in a number of different ways. For example, the programming for the module(s) 308 may be processor executable instructions stored on a non-transitory machine-readable storage medium and the hardware for the module(s) 308 may include a processing resource (e.g., one or more processors), to execute such instructions. In the present examples, the machine-readable storage medium may store instructions that, when executed by the processing resource, implement module(s) 308 or their associated functionalities.

As described previously, the media processing system 202 may be in communication with a plurality of media sources (not depicted in FIG. 3). The plurality of media sources may provide a plurality of media streams 314 to the media processing system 202 corresponding to their respective media contents. Each of the plurality of media streams 314 may include a respective video stream 330 and an audio 332. The media sources may be referred to as media storage devices which may include a repository or a plurality of repositories of media contents. Examples of such media sources may include, but are not limited to, a set-top box, an IP-based media device, a TV satellite box, an IPTV box, an external hard drive, a flash drive, a mobile phone, a laptop, a portable PC, or any other device capable of generating a media stream 314 corresponding to its media content.

In operation, the media processing module 210 may obtain a plurality of media streams 314 from the plurality of media sources. In one example, each of the plurality of media stream 314 obtained from the media sources may include a unique identifier 316 of the media content corresponding to each of the media stream 314. In another example, the unique identifier 316 of the media content corresponding to each of the media stream 314 may be identically assigned to the video stream 330 and audio 332 of the respective media stream 314. In yet another example, the unique identifier 316 may be a 'title' of the media content corresponding to the media stream 314. In yet another example, the unique identifier 316 may be a unique alphanumeric code assigned to each of the media streams 314 obtained at the media processing system 202. However, it may be noted that the aforementioned examples of the unique identifier 316 are only illustrative, and should not be construed to limit the scope of the present subject matter in any manner. Any other unique identifier 316 of each of the media stream 314 may be included with the media stream 314 without deviating from the scope of the present subject matter.

In another example, a plurality of users may provide a plurality of media streams 314 through their respective user devices. In such case, the users, through their respective user devices, may provide the media stream 314. As would be understood, the media processing system 202 may be enabled to wirelessly obtain the media streams 314 from each of the user devices.

In yet another example, the unique identifier 316 associated with each of the media stream 314 may further include one of a username, PIN, password, or any other known mechanism known to a person skilled in the art for securing the media stream 314 of the respective user devices. The unique identifier 316 may be encoded in a machine-readable encoded identifier.

Continuing with the present example, upon obtaining the plurality of media streams 314, the media processing module 210 may generate a mosaiced media stream 318 by combining the plurality of video streams of each of the plurality of obtained media streams 314. In one example, the media processing module 210 may extract image frames of each of the plurality of video streams 330, and may form the mosaiced media stream 318 by juxtaposition of all image frames of each of the plurality of video streams 330. In another example, the media processing module 210 may generate the mosaiced media stream 318 using any predefined application or software known to a person skilled in the art. However, it may be noted that any other technique may also be used to generate the mosaiced media stream 318 without deviating from the scope of the present subject matter.

Continuing further, the mosaiced media stream 318 may be generated such that video stream 330 corresponding to each of the plurality of media streams 314 is rendered in a two-dimensional grid, referred to as mosaiced media stream grid 320 (depicted in FIGS. 3A-3E). The mosaiced media stream grid 320 may be of the form of 'M×N', where 'M' and 'N' corresponds to the number of video streams 330 corresponding to the media streams 314 positioned along the rows and columns respectively of the mosaiced media stream grid 320.

The manner in which the media processing module 210 may form the mosaiced media stream grid 320 may be based on the resolution of the video streams 330 of the obtained media streams 314, referred to as video stream resolution 322 and the processing capabilities of the media processing system 202. The processing capabilities of the media processing system 202 may determine the resolution of the generated mosaiced media stream 318, referred to as target resolution 324. The media processing module 210, based on the video stream resolution 322 and the target resolution 324, may determine the mosaiced media stream grid 320.

In one example, in cases where the video stream resolution 322 of the video streams 330 of all the obtained media streams 314 is identical, the mosaiced media stream grid 320 may have equal number of video streams 330 corresponding to the media streams 314 along the rows and columns of the mosaiced media stream grid 320, i.e., M=N, as depicted in FIGS. 3A-3C. In another example, in cases where the video stream resolution 322 of the video streams 330 of all the obtained media streams 314 is non-identical, the mosaiced media stream grid 320 may have unequal number of video streams 330 corresponding to the media streams 314 along the rows and columns of the mosaiced media stream grid 320, i.e., M≠N, as depicted in FIGS. 3D3E.

Continuing further, the media processing module 210 may integrate the plurality of audios 332 of each of the plurality of media streams 314 with the mosaiced media stream 318 to obtain an audio integrated mosaiced media stream 326. In one example, the media processing module 210 may integrate the plurality of audios 332 of each of the plurality of obtained media streams 314 in an audio channel. In another example, the audio channel may be obtained based on Advanced Audio Coding Standard. However, it may be noted that any other technique or standard may be used for integrating the plurality of audios 332 with the mosaiced media stream 318 without deviating from the scope of the present subject matter.

Continuing further, the audio integrated mosaiced media stream 326 may then be encoded. In one example, as depicted in FIG. 3, an encoding system 214 may be communicatively coupled to the media processing system 202. The encoding system 214 may include an encoder 334. In such cases, the media processing module 210 may transmit the audio integrated mosaiced media stream 326 to the encoding system 214. The encoder 334 may encode the audio integrated mosaiced media stream 326 to obtain an encoded stream 336. In another example, the encoding system 214 may be implemented within the media processing system 202 without deviating from the scope of the present subject matter. Further, the audio integrated mosaiced media stream 326 may be encoded using any technique known to a person skilled in the art.

Thereafter, the media processing module 210 may transmit the encoded stream 336 to a media processing server (not shown in FIG. 3). The media processing server may encapsulate the encoded stream 336 via a video transport protocol. The media processing server may then transmit the encoded stream 336 to a receiver system (not shown in FIG. 3). The receiver system may receive the encoded stream 336. In another example, the media processing server may also encrypt the encoded stream 336. In yet another example, the encryption may be done using a shared key, negotiate key, private key, public key, or any other method known to a person skilled in the art.

Figure 4:
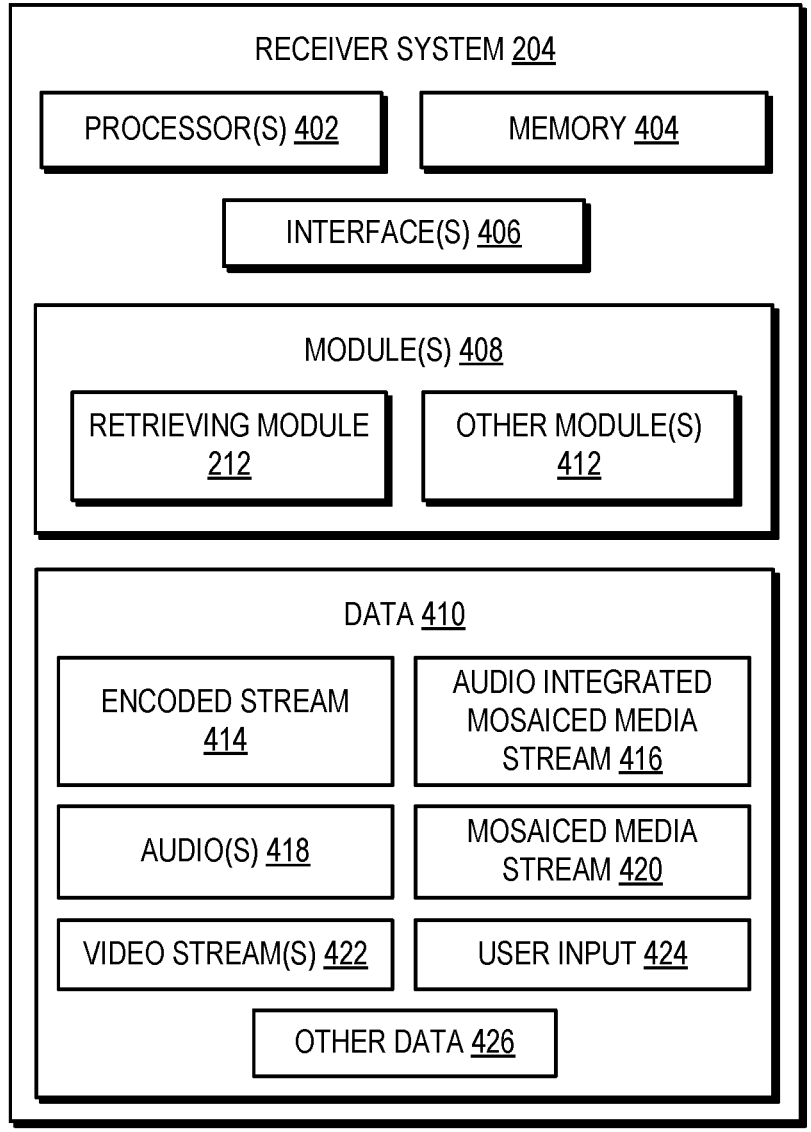
FIG. 4 is a detailed block diagram of an example receiver system, as per an example of the present subject matter.

The manner in which the receiver system receives the encoded stream 336 and renders the video stream and matching audio corresponding to a media stream from amongst a plurality of media streams on the video display system is described in further details in conjunction with FIG. 4.

FIG. 4 is a detailed block diagram of a receiver system, as per an example of the present subject matter. In an example, the receiver system may correspond to the receiver system 204 depicted in FIG. 2. The receiver system 204 may include a processor(s) 402, a memory 404, and an interface(s) 406. The processor(s) 402, memory 404, and the interface(s) 406 may be implemented in a similar manner as those of processor(s) 302, memory 304, and interface(s) 306 as explained previously in conjunction with FIG. 3.

The receiver system 204 may further include module(s) 408 and data 410. The module(s) 408 may be implemented as module(s) 308 as explained previously in conjunction with FIG. 3. In one example, the module(s) 408 may include the retrieving module 212 and other module(s) 412. The data 410, on the other hand, includes encoded stream 414, audio integrated mosaiced media stream 416, audio(s) 418, mosaiced media stream(s) 420, video stream(s) 422, user input 424, and other data 426. Further, the other data 426, amongst other things, may serve as a repository for storing data that is processed, or received, or generated as a result of the execution of one or more modules in the module(s) 408.

As described previously, the receiver system 204 may be in communication with the media processing server 206 over a network, such as network 208 as described in FIG. 2. In operation, the receiver system 204 may receive an encoded stream 414 from the media processing server 206. Upon receiving the encoded stream 414, the retrieving module 212 may decode the encoded stream 414 to obtain the audio integrated mosaiced media stream 416. As described previously, the audio integrated mosaiced media stream 416 may include the plurality of audios 418 with the mosaiced media stream 420. Further, the mosaiced media stream 420, as described previously, may include a plurality of video streams 422 of a plurality of media streams 418. The retrieving module 212 may then extract the plurality of audios 418 and the mosaiced media stream 420 from the audio integrated mosaiced media stream 416. Thereafter, the retrieving module 212 may then deconstruct the mosaiced media stream 420 to retrieve the plurality of video streams 422 of each of the plurality of media streams. It may be noted that the mosaiced media stream 420 may be deconstructed to retrieve the plurality of video streams 422 of each of the plurality of media streams using any technique known to a person skilled in the art.

The receiver system 204 may be further coupled to video display system (not depicted in FIG. 4). Upon retrieval of the plurality of video streams 422 of each of the plurality of media streams, the retrieving module 212 may then match one of the audio 418 from the plurality of extracted audios 418 with a corresponding video stream 422 from the plurality of retrieved video streams 422. In one example, as described previously, a unique identifier of the media stream may be identically assigned to the video stream 422 and audio 418 of the respective media stream. In such cases, the retrieving module 212 may match the audio 418 with the corresponding video stream 422 based on the unique identifier.

Thereafter, the retrieving module 212 may transmit each of the plurality of media streams to the video display system. The video display system may, thereafter, render the video stream 422 and the matching audio 418 corresponding to each of the plurality of media stream on a display device (not shown in FIG. 4) coupled to the video display system. In one example, the retrieving module 212 may render the video stream 422 corresponding to each of the plurality of media streams on the display device in a two-dimensional grid.

The user, upon being provided with media contents corresponding to the plurality of media streams, may then provide a user input 424 to select the media content to be displayed or played on the display device. Based on the received user input 424, the retrieving module 212 may identify a corresponding media content from amongst the plurality of rendered media contents. For example, the user may select the unique identifier, such as unique identifier 316, of one of the rendered media content corresponding to the media stream. The retrieving module 212 may identify the corresponding media stream, and may then render the video stream 422 and the matching audio 418 corresponding to the identified media stream on the display device. The rendered video stream 422 corresponding to the identified media stream may then be expanded to occupy the entire area of the screen of the display device, and the matching audio 418 may be played through the audio output of the video display system.

In another example, in cases where the media streams were provided by respective users through their user devices, the retrieving module 212 may authenticate the user before rendering the media content corresponding to the media stream on the video display system. In such cases, the user input 424 may include the unique identifier such as password, PIN, QR code, or any other securing technique which may be used by the user while providing the media from their respective user devices.

The audio integrated mosaiced media stream 416 may be authenticated before retrieving the plurality of media streams. For example, in response to successful user authentication, the retrieving module 212 may identify a corresponding media stream from amongst the plurality of media streams of the audio integrated mosaiced media stream 416.

Continuing with the present example, the retrieving module 212 may then filter the audio integrated mosaiced media stream 416 to obtain the corresponding identified media stream, and may render the video stream 422 and audio 418 corresponding to the identified media stream on the display device. In one example, filtering may include refraining displaying all the media contents corresponding to all the media streams on the display device. Only the media content corresponding to the identified media stream may be displayed to the respective user on the display device. In another example, filtering may refer to removing any graphic content that may overlap on the video stream 422 when displayed on the display device.

Figure 5:
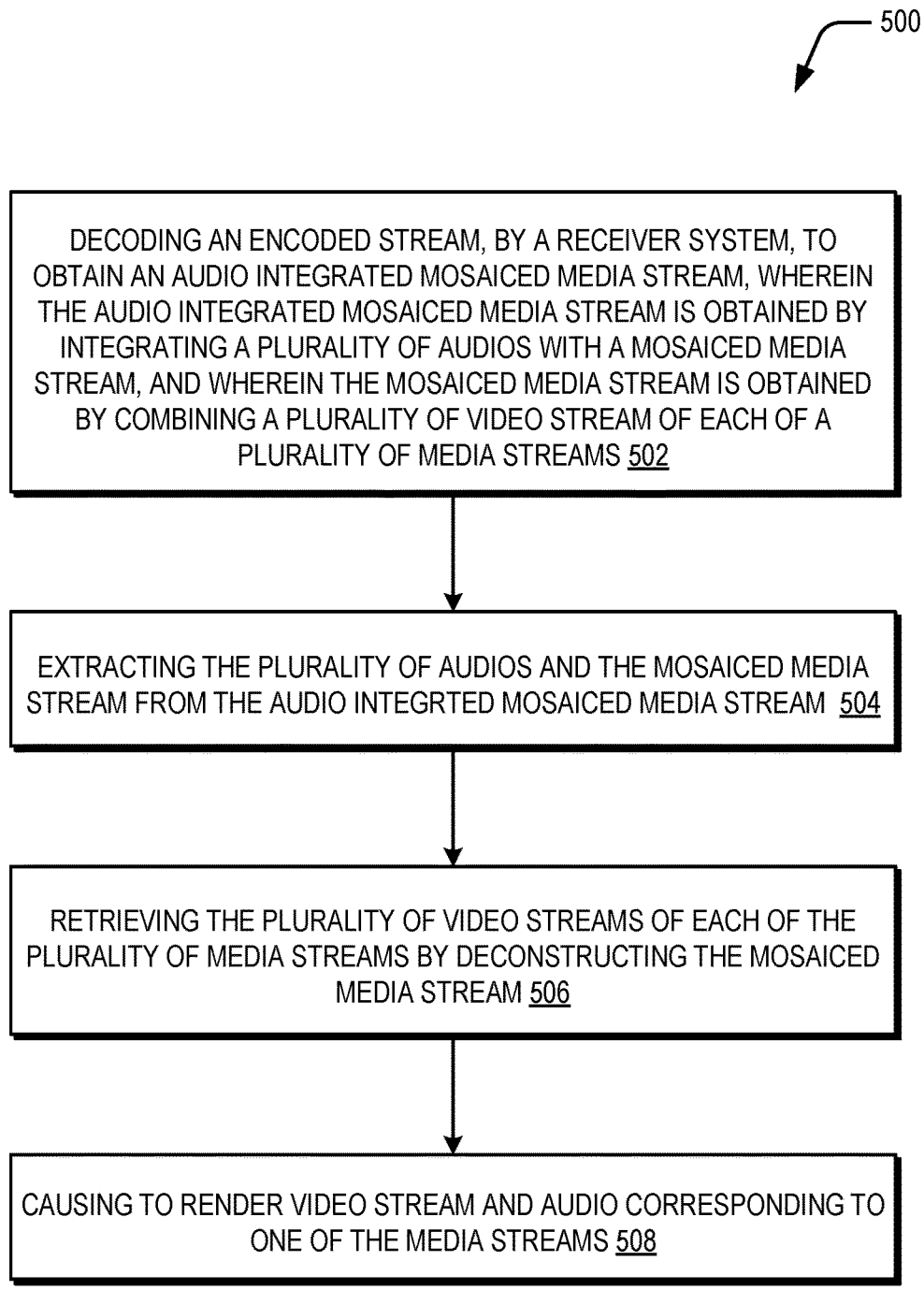
FIG. 5 is a flowchart of an example method to be implemented by a receiver system, as per an example of the present subject matter.

FIG. 5 illustrates a method 500 to be implemented by receiver system 104, as per an example of the present subject matter. Although the method 500 may be implemented for servicing of a variety of computing devices, for the ease of explanation, the present description of the example method 500 is provided in reference to the above-described receiver system 104. The order in which the various method blocks of method 500 are described, is not intended to be construed as a limitation, and any number of the described method blocks may be combined in any order to implement the method 500, or an alternative method.

The blocks of the method 500 may be implemented through instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 502, an encoded stream may be decoded at the receiver system to obtain an audio integrated mosaiced media stream, wherein the audio integrated mosaiced media stream is obtained by integrating a plurality of audios with a mosaiced media stream, and wherein the mosaiced media stream is obtained by combining a plurality of video streams of each of a plurality of media streams. For example, the receiver system 104 may be communicatively coupled to the media server system 206 over the network 208. The receiver system 204 may receive the encoded stream 414 from the media processing server 206. Upon receiving the encoded stream 414, the retrieving module 212 may decode the encoded stream 414 to obtain the audio integrated mosaiced media stream 416. The audio integrated mosaiced media stream 416 may include the plurality of audios 418 and the plurality of video streams 422.

At block 504, the plurality of audios and the mosaiced media stream may be extracted from the audio integrated mosaiced media stream. For example, the retrieving module 212 may then extract the plurality of audios 418 and the mosaiced media stream 420 from the audio integrated mosaiced media stream 416.

At block 506, the plurality of video streams of each of the plurality of media streams may be retrieved by deconstructing the mosaiced media stream. For example, the retrieving module 212 may then deconstruct the mosaiced stream 416 to retrieve the plurality of video streams 422 of each of the plurality of media streams. It may be noted that the mosaiced media stream 420 may be deconstructed to retrieve the plurality of video streams 422 of each of the plurality of media streams using any technique known to a person skilled in the art.

At block 508, video stream and audio corresponding to one of the media streams may be rendered. For example, upon retrieval of the plurality of video streams 422 of each of the plurality of media streams, the retrieving module 212 may transmit each of the plurality of media streams to each of the video display systems 216. The video display systems 216 may thereafter, render the video stream 422 and audio 418 corresponding to each of the plurality of media stream on the display device 218.

Figure 6:
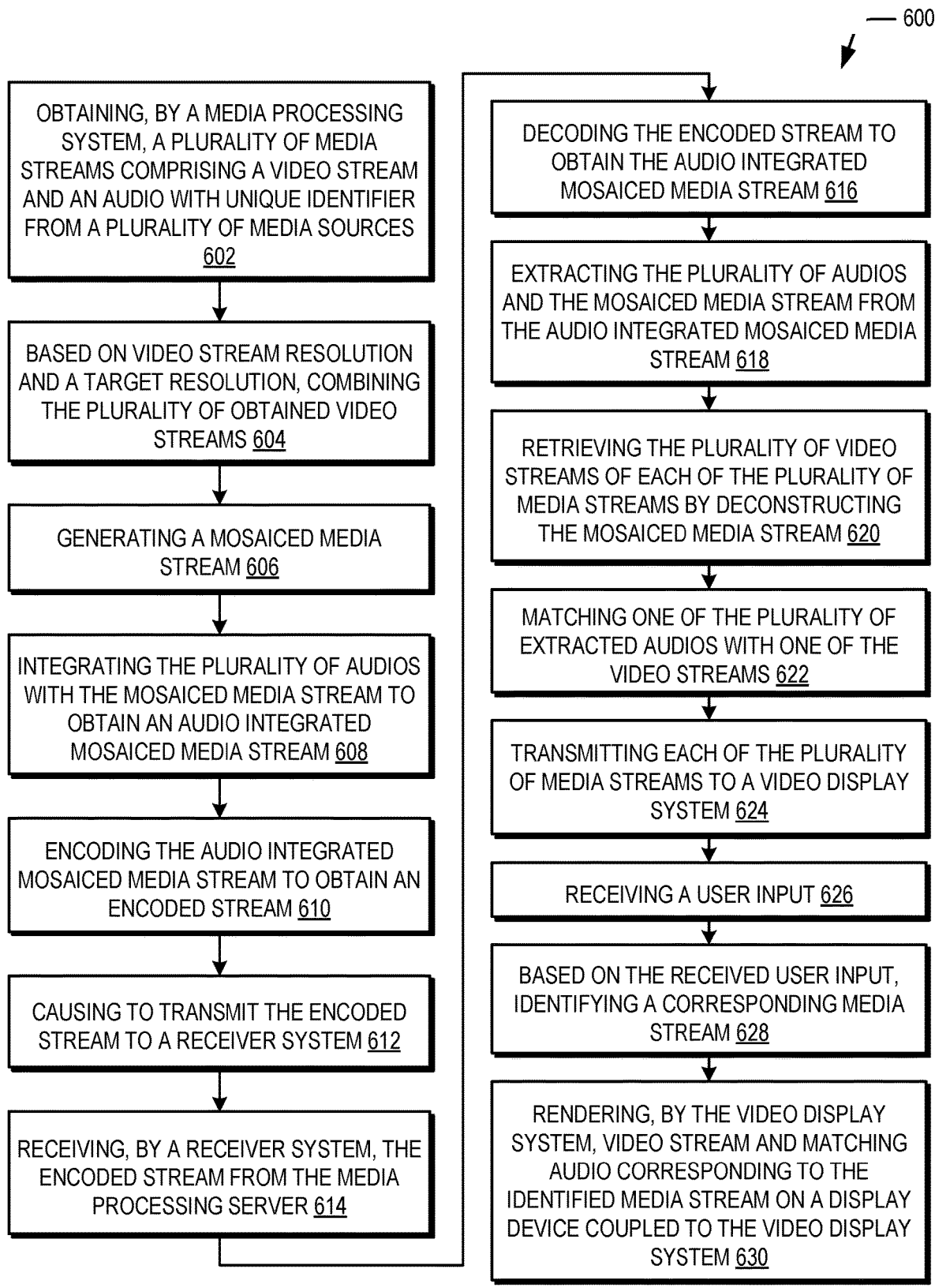
FIG. 6 is a flowchart of an example method to be implemented by a media processing system and a receiver system, as per another example of the present subject matter.

FIG. 6 illustrates a method 600 to be implemented by media processing system 102 and receiver system 104, as per another example of the present subject matter. Although the method 600 may be implemented for servicing of a variety of computing devices, for the ease of explanation, the present description of the example method 600 is provided in reference to the above-described media processing system 102 and receiver system 104. The order in which the various method blocks of method 600 are described, is not intended to be construed as a limitation, and any number of the described method blocks may be combined in any order to implement the method 600, or an alternative method.

The blocks of the method 600 may be implemented through instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 602, a plurality of media streams including a video stream and an audio with a unique identifier may be obtained at a media processing system. The plurality of media streams may be obtained from a plurality of media sources. For example, the media processing system 202 may be in communication with and obtain a plurality of media streams 314 from a plurality of media sources. Each of the plurality of media streams 314 may include a respective video stream 330 and an audio 332. The media sources may be referred to as media storage devices which may include a repository or a plurality of repositories of media contents. Examples of such media sources may include, but are not limited to, a set-top box, an IP-based media device, a TV satellite box, an IPTV box, an external hard drive, a flash drive, a mobile phone, a laptop, a portable PC, or any other device capable of generating a media stream corresponding to its media content.

In one example, each of the plurality of media streams 314 obtained from the media sources may include a unique identifier 316 of the media content corresponding to each of the media stream 314. In another example, the unique identifier 316 of the media content corresponding to each of the media stream 314 may be identically assigned to the video stream 330 and audio 332 of the respective media stream 314. In yet another example, the unique identifier 316 may be a 'title' of the media content corresponding to the media stream 314. In yet another example, the unique identifier 316 may be a unique alphanumeric code assigned to each of the media streams 314 obtained at the media processing system 202.

At block 604 and block 606, the plurality of obtained video streams may be combined based on video stream resolution and a target resolution, and a mosaiced media stream grid may be generated. For example, upon obtaining the plurality of media streams 314, the media processing module 210 may generate a mosaiced media stream 318 by combining the plurality of video streams of each of the plurality of obtained media streams 314. In one example, the media processing module 210 may extract image frames of each of the plurality of video streams 330, and may form the mosaiced media stream 318 by juxtaposition of all image frames of each of the plurality of video streams 330.

The mosaiced media stream 318 may be generated such that video stream 330 corresponding to each of the plurality of media streams 314 is rendered in a twodimensional grid, referred to as mosaiced media stream grid 320. The mosaiced media stream grid 320 may be of the form of 'M×N', where 'M' and 'N' corresponds to the number of video streams 330 corresponding to the media streams 314 positioned along the rows and columns respectively of the mosaiced media stream grid 320. The mosaiced media stream grid 320 may be formed based on the resolution of the video streams 330 of the obtained media streams 314, referred to as video stream resolution 322 and the processing capabilities of the media processing system 202. The processing capabilities of the media processing system 202 may determine the resolution of the generated mosaiced media stream 318, referred to as target resolution 324. The media processing module 210, based on the video stream resolution 322 and the target resolution 324, may determine the mosaiced media stream grid 320.

At block 608, the plurality of audios may be integrated with the mosaiced media stream to obtain an audio integrated mosaiced media stream. For example, the media processing module 210 may then integrate the plurality of audios 332 of each of the plurality of media streams 314 with the mosaiced media stream 318 to obtain an audio integrated mosaiced media stream 326. In one example, the media processing module 210 may integrate the plurality of audios 332 of each of the plurality of obtained media streams 314 in an audio channel. In another example, the audio channel may be obtained based on Advanced Audio Coding Standard.

At block 610, the audio integrated mosaiced media stream may be encoded to obtain an encoded stream. For example, the audio integrated mosaiced media stream 326 may then be encoded. In one example, the encoding system 214 may be communicatively coupled to the media processing system 202. The encoding system 214 may include an encoder 334. In such cases, the media processing module 210 may transmit the audio integrated mosaiced media stream 326 to the encoding system 214. The encoder 334 may encode the audio integrated mosaiced media stream 326 to obtain an encoded stream 336.

At block 612, the encoded stream may be caused to be transmitted to a receiver system. For example, the media processing module 210 may then transmit the encoded stream 336 to a media processing server 206. The media processing server 206 may encapsulate the encoded stream 336 via a video transport protocol. The media processing server 206 may then transmit the encoded stream 336 to the receiver system 204. The receiver system 204 may be in communication with the media processing server 206 over the network 208. In another example, the media processing server 206 may also encrypt the encoded stream 336. In yet another example, the encryption may be done using a shared key, negotiate key, private key, public key, or any other method known to a person skilled in the art.

At block 614, the encoded stream from the media processing server may be received at the receiver system. For example, the receiver system 204 may then receive an encoded stream 414 from the media processing server 206.

At block 616, the encoded stream may be decoded to obtain the audio integrated mosaiced media stream. For example, upon receiving the encoded stream 414, the retrieving module 212 may decode the encoded stream 414 to obtain the audio integrated mosaiced media stream 416.

At block 618, the plurality of audios and the mosaiced media stream may be extracted from the audio integrated mosaiced media stream. For example, the audio integrated mosaiced media stream 416 may include the plurality of audios 418 with the mosaiced media stream 420. The retrieving module 212 may then extract the plurality of audios 418 and the mosaiced media stream 420 from the audio integrated mosaiced media stream 416.

At block 620, the plurality of video streams of each of the plurality of media streams may be retrieved by deconstructing the mosaiced media stream. For example, the mosaiced media stream 420 may include a plurality of video streams 422 of the plurality of media streams 418. The retrieving module 212 may then deconstruct the mosaiced media stream 420 to retrieve the plurality of video streams 422 of each of the plurality of media streams.

At block 622, one of the plurality of extracted audios may be matched with one of the video streams. For example, the retrieving module 212 may then match one of the audio 418 from the plurality of extracted audios 418 with a corresponding video stream 422 from the plurality of retrieved video streams 422. In one example, a unique identifier of the media stream may be identically assigned to the video stream 422 and audio 418 of the respective media stream. In such cases, the retrieving module 212 may match the audio 418 with the corresponding video stream 422 based on the unique identifier.

At block 624, each of the plurality of media streams may be transmitted to a video display system. For example, the receiver system 204 may be further coupled to a plurality of video display systems 216. The video display system 216 may be any display device capable of receiving media stream from the receiver system 204 and rendering video stream and matching audio corresponding to the received media stream. Each of the plurality of video display systems 216 may further include a coupled display device 218. Examples of such combination of video display system 216 and display device 218 may include, but are not limited to, a television (TV), display monitor, projector, or any other display device. In one example, such video display system 216 and display device 218 may be installed independently at any residential or commercial location, in combination with other electronic devices. In another example, such video display system 216 and display system 218 may be installed in a vehicle such as an automobile or an aircraft in the form of In-Flight Entertainment. It may also be noted that such examples of video display system 216 and display device 218 are only illustrative, and should not be construed to limit the scope of the present subject matter in any manner.

Continuing with the present example, upon retrieval of the plurality of video streams 422 and matching audio 418 of each of the plurality of media streams, the retrieving module 212 may transmit each of the plurality of media streams to the video display system. The video display system may, thereafter, render the video stream 422 and the matching audio 418 corresponding to each of the plurality of media stream 418 on a display device coupled to the video display system. In one example, the retrieving module 212 may render the video stream 422 corresponding to each of the plurality of media streams 418 on the display device in a two-dimensional grid.

At block 626, a user input may be received. For example, the user, upon being provided with media contents corresponding to the plurality of media streams, may then provide a user input 424 to select the media content to be displayed or played on the display device.

At block 628, a corresponding media stream may be identified based on the received user input. For example, the retrieving module 212, based on the received user input 424, may identify a corresponding media content from amongst the plurality of rendered media contents. For example, the user may select the unique identifier, such as unique identifier 316, of one of the rendered media content corresponding to the media stream.

At block 630, video and matching audio corresponding to the identified media stream may be rendered by the video display system on a display device coupled to the video display system. For example, the retrieving module 212 may identify the corresponding media stream, and may then render the video stream 422 and the matching audio 418 corresponding to the identified media stream on the display device. The rendered video stream 422 corresponding to the identified media stream may then be expanded to occupy the entire area of the screen of the display device, and the matching audio 418 may be played through the audio output of the video display system.

Figure 7:
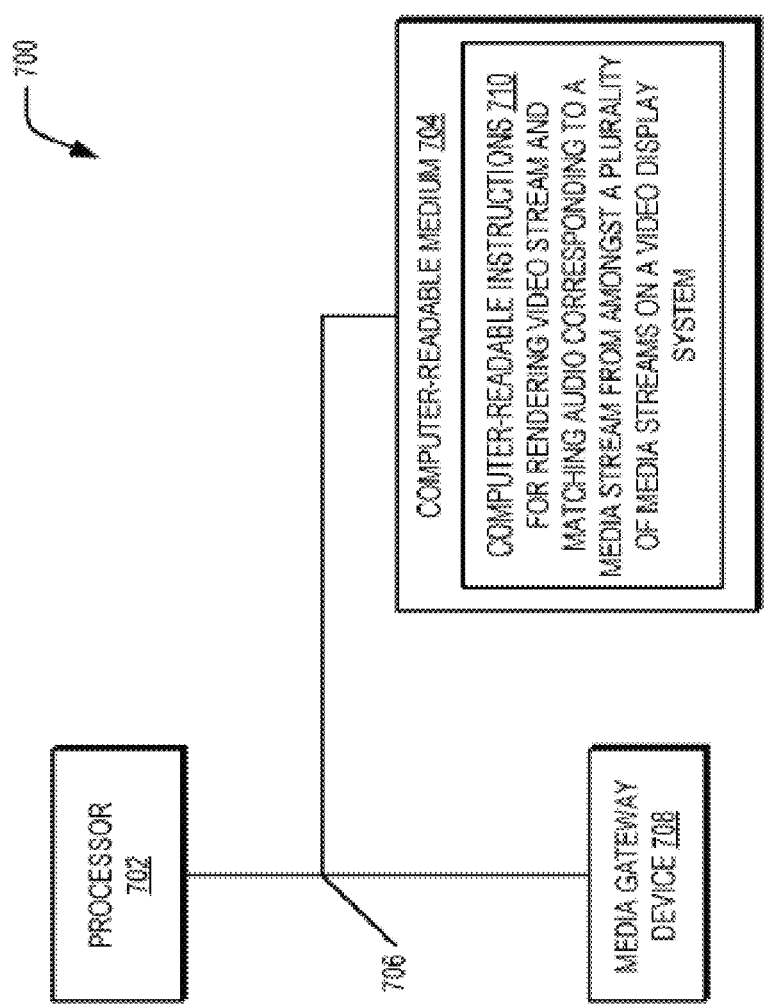
FIG. 7 illustrates a non-transitory computer-readable medium for causing a media gateway device to render video stream and matching audio corresponding to a media stream from amongst a plurality of media streams on a video display system, as per an example of the present subject matter.

FIG. 7 illustrates a computing environment 700 implementing a nontransitory computer readable medium for rendering video stream and matching audio corresponding to a media stream from amongst a plurality of media streams on a video display system. In an example, the computing environment 700 includes processor 702 communicatively coupled to a non-transitory computer readable medium 704 through communication link 706. In an example, the processor 702 may have one or more processing resources for fetching and executing computer-readable instructions from the non-transitory computer readable medium 704. The processor 702 and the non-transitory computer readable medium 704 may be implemented in a media gateway device 708.

The non-transitory computer readable medium 704 may be, for example, an internal memory device or an external memory. In an example implementation, the communication link 706 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 704 includes a set of computer readable instructions 710 which may be accessed by the processor 702 through the communication link 706 and subsequently executed to render media corresponding to a media stream from amongst a plurality of media streams on a video display system.

Referring to FIG. 7, in an example, the non-transitory computer readable medium 704 includes computer readable instructions 710 that cause the processor 702 to receive an encoded stream. The encoded stream may be obtained by encoding an audio integrated mosaiced media stream. The instructions 710 may further cause the processor 702 to decode the encoded stream to obtain the audio integrated mosaiced media stream. The audio integrated mosaiced media stream may include a plurality of media steams provided by respective users through their user devices. The instructions 710 may further cause the processor 702 to identify a corresponding media stream from amongst the plurality of media streams, in response to user authentication.

Further, the instructions 710 may cause the processor 702 to filter the audio integrated mosaiced media stream to obtain the corresponding identified media stream from amongst the plurality of media streams. Furthermore, the instructions 710 may cause the processor 702 to render video stream and matching audio corresponding to the identified media stream on a display device.

Figure 8:
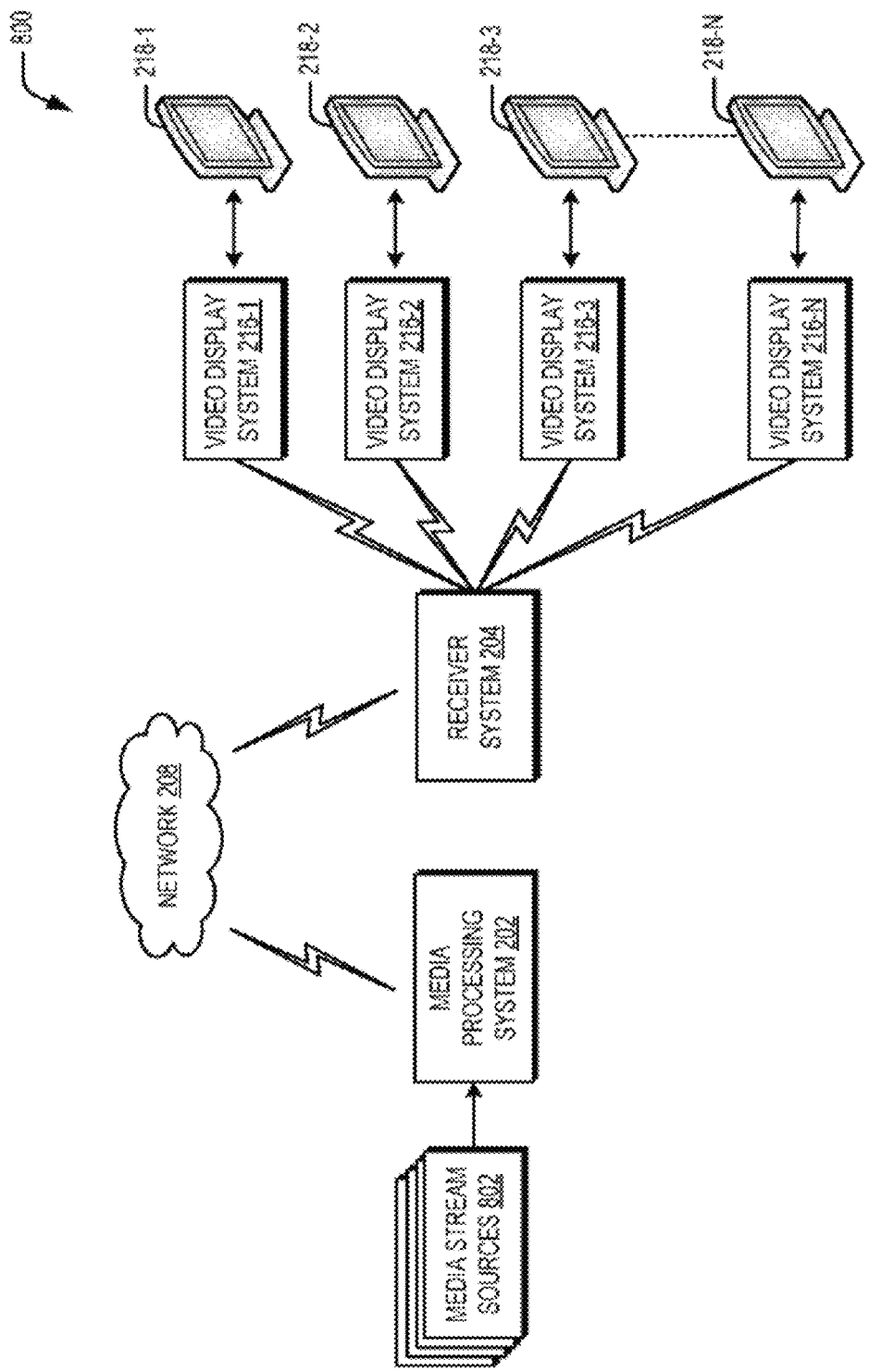
FIG. 8 illustrates a detailed block diagram of an example network environment with an example media processing system and an example receiver system, as per an example of the present subject matter.
Figure 9:
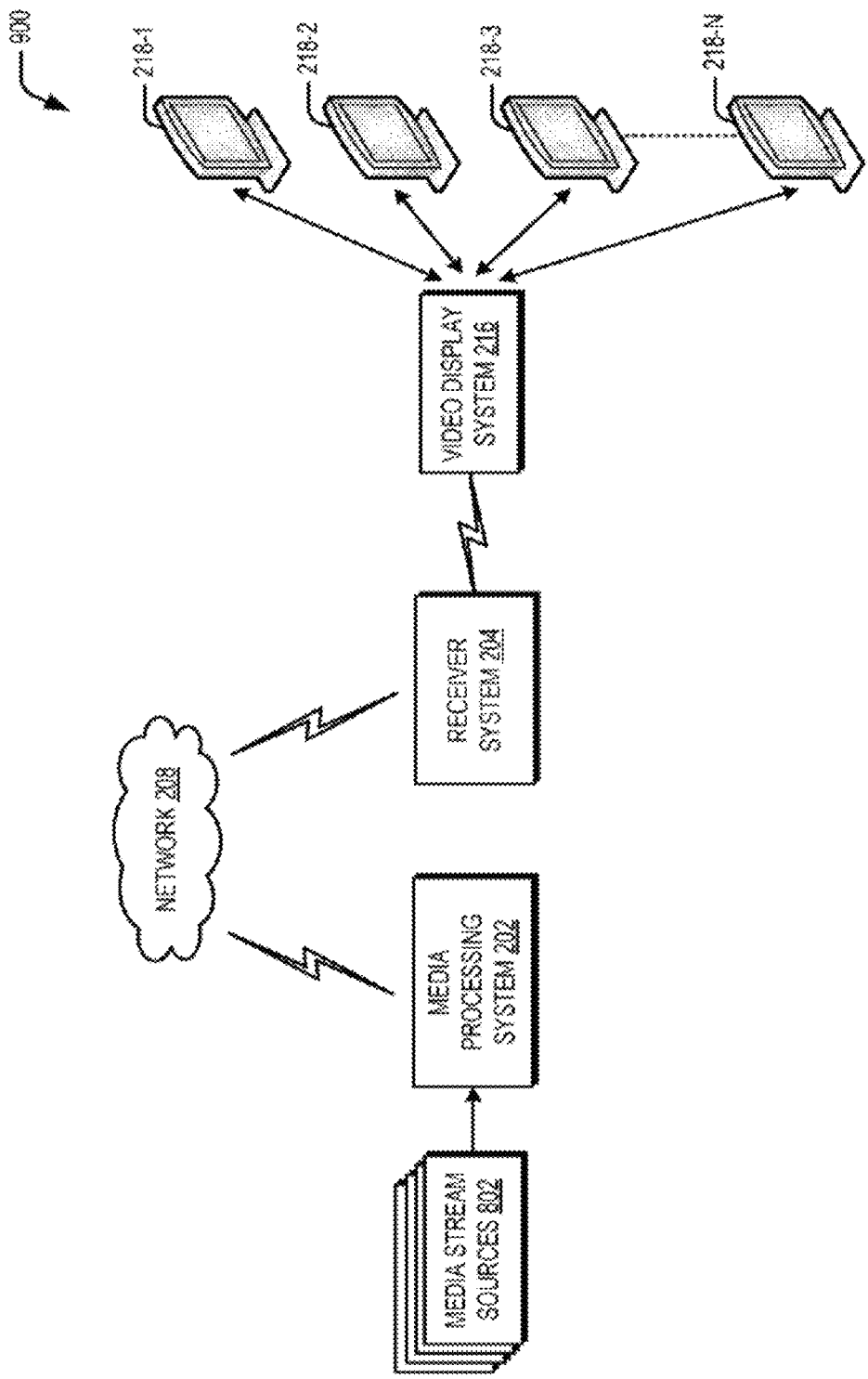
FIG. 9 illustrates a detailed block diagram of an example network environment with an example media processing system and an example receiver system, as per another example of the present subject matter.
Figure 10:
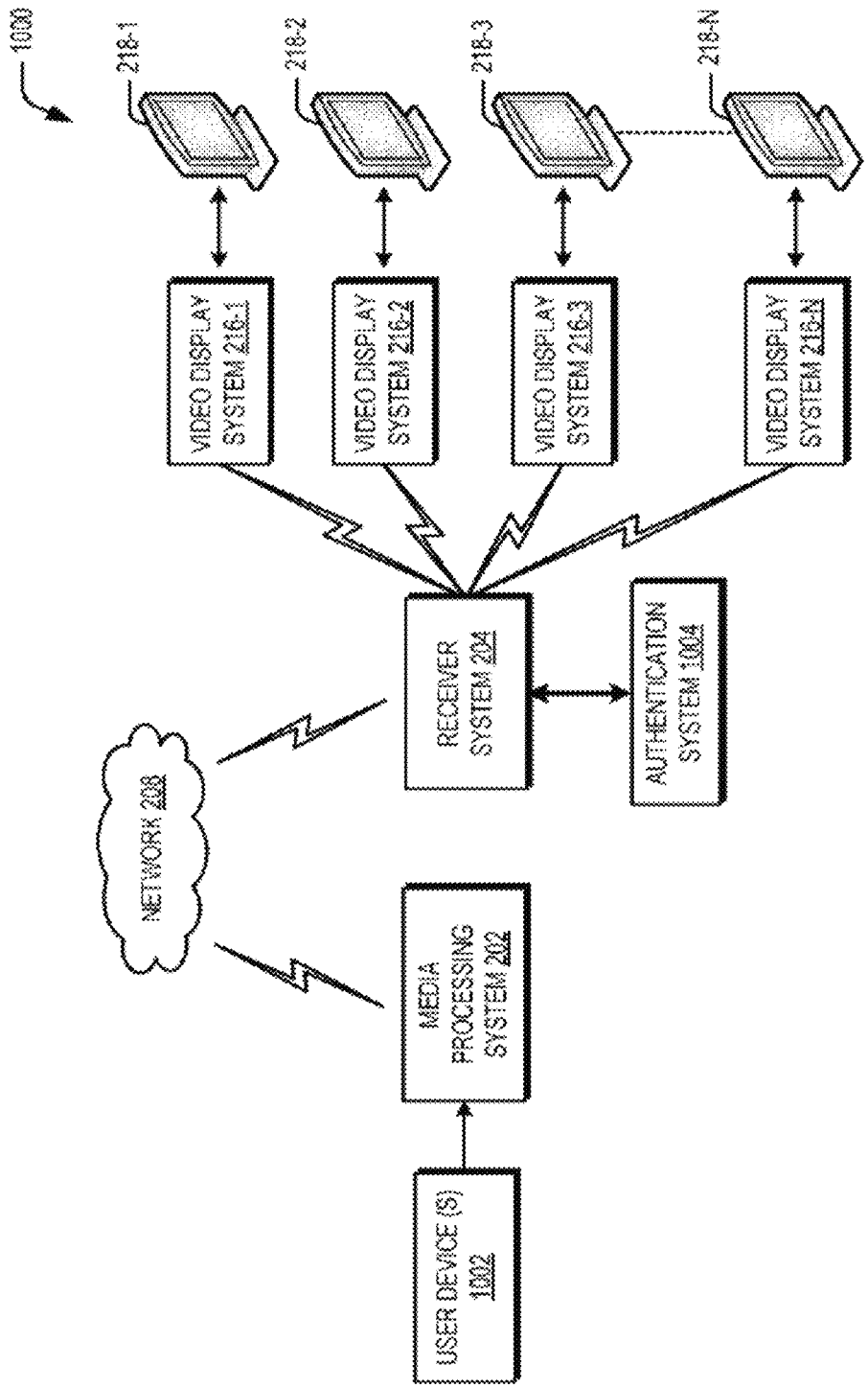
FIG. 10 illustrates a detailed block diagram of an example network environment with an example media processing system and an example receiver system, as per yet another example of the present subject matter.

FIGS. 8-10 illustrate example network environments with example media processing system 202 and example receiver system 204 for rendering video stream and audio corresponding to a media stream from amongst a plurality of media streams on a video display system, as per examples of the present subject matter. It may be noted that the manner in which various components of the network environment are coupled and communicate with each other as depicted in network environments in FIGS. 8-10 are only illustrative. Any other implementation of the components in the network environment, or any other combination of FIGS. 8-10 are also possible within the scope of the present subject matter.

As depicted in FIG. 8, the media processing system 202 may be in communication with the receiver system 204 over the network 208. In operation, the media processing system 202 may be in communication with and obtain media streams from a plurality of media stream sources 802. The media sources 802 may be referred to as media storage devices which may include a repository or a plurality of repositories of media contents. Examples of such media sources 802 may include, but are not limited to, a set-top box, an IP-based media device, a TV satellite box, an IPTV box, an external hard drive, a flash drive, a mobile phone, a laptop, a portable PC, or any other device capable of generating a media stream corresponding to its media content.

In operation, a plurality of media streams may be obtained from the media source 802 at the media processing system 202. Each of the plurality of obtained media streams may include a video stream and an audio. A mosaiced media stream may then be generated by combining the video streams of each of the plurality of obtained media streams. The mosaiced media stream may then be integrated with the plurality of audios to obtain an audio integrated mosaiced media stream.

Thereafter, the audio integrated mosaiced media stream may be encoded to generate an encoded stream. Thereafter, the encoded stream may be transmitted to the receiver system 204 via a media processing server (not shown in FIGS. 8-10). The receiver system 204 may receive the encoded stream from the media processing server.

Upon receiving the encoded stream at the receiver system 204, the encoded stream may be decoded to obtain the audio integrated mosaiced media stream. As described previously, the audio integrated mosaiced media stream may include the plurality of audios integrated with the mosaiced media stream. Further, the mosaiced media stream may include the plurality of video streams of each of the plurality of media streams. The plurality of audios and the mosaiced media stream may then be extracted from the audio integrated mosaiced media stream. The mosaiced media stream may then be deconstructed to retrieve the plurality of video streams of each of the plurality of media streams.

The receiver system 204 may be further coupled to a plurality of video display system(s) 216-1, 216-2, 216-3, . . . , 216-N (collectively referred to as video display system 216). Each of the plurality of video display systems 216 may further include a coupled display device 218. Examples of such combination of video display system 216 and display device 218 may include, but are not limited to, a television (TV), display monitor, projector, or any other display device. In another example, as depicted in network environment 900 in FIG. 9, the receiver system 204 may be coupled to a single video display system 216, which in turn may be coupled to a plurality of display devices 218-1, 218-2, 218-3, . . . , 218-N (collectively referred to as display devices 218).

In one example, such video display system 216 and display device 218 may be installed independently at any residential or commercial location, in combination with other electronic devices. In another example, such video display system 216 and display system 218 may be installed in a vehicle such as an automobile or an aircraft in the form of In-Flight Entertainment. It may also be noted that such examples of video display system 216 and display device 218 are only illustrative, and should not be construed to limit the scope of the present subject matter in any manner.

Continuing with the present example, upon retrieval of each of the plurality of media streams, each of the plurality of media streams may then be transmitted to each of the video display systems 216. The video display systems 216 may thereafter, render media content corresponding to each of the plurality of media stream on the display device. The user of the display device 218 may then provide a user input to select one of the media content from the plurality of rendered media contents on the display device 218. Based on the received user input, a corresponding media stream from amongst the plurality of media streams may then be identified and the video stream and audio corresponding to the identified media stream may then be rendered on the display devices 218.

In cases where multiple display devices 218 may be coupled to a single video display system 216, as depicted in network environment 900 in FIG. 9, media content corresponding to each of the plurality of retrieved media streams may be rendered on each of the coupled display devices 218. As would be understood, each of the display devices 218 may be operated by different respective users. Each user of the corresponding display device 218 may then provide a user input to select one of the media content from the plurality of rendered media contents on the display device 218. Based on the received user input at each of the plurality of display devices 218, a corresponding media stream from amongst the plurality of media streams may then be identified and the video stream and audio corresponding to the identified media stream may then be rendered on each of the display devices 218.

In another example, as depicted in network environment 1000 in FIG. 10, a plurality of user device(s) 1002 may be coupled to the media processing system 202. In such case, the users may provide a plurality of media streams through their respective user devices 1002. The media processing system 202 may be enabled to wirelessly obtain the media streams from each of the user devices 1002.

In yet another example, each of the plurality of media stream obtained from the user devices 1002 may include a unique identifier of the media content corresponding to each of the media streams. The unique identifier associated with each of the media streams may include one of a username, PIN, password, or any other known mechanism known to a person skilled in the art for securing the media stream of the respective user devices 1002. The unique identifier may be encoded in a machine-readable encoded identifier.

Continuing with the present example, a mosaiced media stream may then be generated by combining the video streams of the plurality of obtained media streams. The plurality of audios of each of the plurality of obtained media streams may then be integrated with the mosaiced media stream to obtain an audio integrated mosaiced media stream. Thereafter, the audio integrated mosaiced media stream may be encoded to generate an encoded stream. Thereafter, the encoded stream may be transmitted to the receiver system 204, via a media processing server. The receiver system 204 may receive the encoded stream from the media processing server. Upon receiving the encoded stream, the encoded stream may be decoded to obtain the audio integrated mosaiced media stream. The plurality of audios and the mosaiced media stream may then be extracted from the audio integrated mosaiced media stream, and the mosaiced media stream may then be deconstructed to retrieve the plurality of video streams of each of the plurality of media streams.

Continuing with the present example, the network environment 1000 may further include an authentication system 1004 coupled to the receiver system 204. Upon retrieval of each of the plurality of media streams, the authentication system 1004 may authenticate the user to identify a corresponding media stream from amongst the plurality of media streams. In another example, the authentication system 1004 may be implemented within the receiver system 104 and the receiver system 104 may perform the user authentication.

Continuing further, a user input may be received from the user. The user input may include the unique identifier such as password, PIN, QR code, or any other securing technique which may be used by the user while providing the media by the user from the respective user device 1002. In response to successful user authentication, a corresponding media stream from amongst the plurality of media streams may be identified.

Thereafter, the audio integrated mosaiced media stream may be filtered to obtain the corresponding identified media stream, and the video stream and audio corresponding to the identified media stream may then be rendered on the display device 218 through the video display system 216. In one example, filtering may include refraining displaying all the media contents corresponding to all the media streams on the display device 218. Only the media content corresponding to the identified media stream may be displayed to the respective user on the display device 218. In another example, filtering may refer to removing any graphic content that may overlap on the video stream when displayed on the display device.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

The invention claimed is:

1. A network environment, the network environment comprising:
    a media processing system, the media processing system comprising:
      a processor;
      a media processing module coupled to the processor, wherein the media processing module is configured to:
        obtain a plurality of media streams, wherein each of the plurality of obtained media streams comprises a video stream and an audio;
        generate a mosaiced media stream by combining the plurality of video streams of each of the plurality of obtained media streams;
        encode the mosaiced media stream to obtain an encoded stream; and
        cause to transmit the encoded stream;
    a receiver system communicatively coupled to the media processing system to receive the encoded stream, the receiver system comprising:
      a processor;
      a retrieving module coupled to the processor, wherein the retrieving module is configured to:
        deconstruct the encoded stream to retrieve the plurality of video streams and audio of each of the plurality of obtained media streams;
        identify a media stream from amongst the plurality of media streams, in response to receiving a user input; and cause to render video stream and matching audio corresponding to the identified media stream on a display device.

2. The network environment according to claim 1, wherein the media processing module is further configured to:
integrate the plurality of audios with the mosaiced media stream to obtain an audio integrated mosaiced media stream; and
encode the audio integrated mosaiced media stream to obtain an encoded stream.

3. The network environment according to claim 2, wherein the plurality of audios is integrated with the mosaiced media stream in an audio channel based on Advanced Audio Coding Standard.

4. The network environment according to claim 1, wherein the media processing module is further configured to transmit the encoded stream to a media processing server, wherein the media processing server is configured to:
encapsulate the encoded stream via a video transport protocol; and
transmit the encapsulated encoded stream to the receiver system.

5. The network environment according to claim 1, wherein the plurality of media streams is obtained from a plurality of media sources, wherein the plurality of media sources is communicatively coupled to the media processing system.

6. The network environment according to claim 1, wherein the video stream of one of the media stream from amongst the plurality of media streams is of a different resolution.

7. The network environment according to claim 1, wherein the generated mosaiced media stream is of a target resolution.

8. The network environment according to claim 1, wherein the media processing module is configured to combine the video stream of each of the plurality of media streams to generate the mosaiced media stream such that the video stream corresponding to each of the plurality of media streams is to be rendered in a two-dimensional grid.

9. The network environment according to claim 8, wherein two-dimensional grid of the generated mosaiced stream is based on number and resolution of media streams within the plurality of media streams and the target resolution of the mosaiced media stream.

10. The network environment according to claim 1, wherein the video stream and the audio of each of the plurality of media streams is associated with a respective unique identifier.

11. A method comprising:
decoding an encoded stream to obtain an audio integrated mosaiced media stream, wherein the audio integrated mosaiced media stream is obtained by integrating a plurality of audios with a mosaiced media stream, and wherein the mosaiced media stream is obtained by combining a plurality of video streams of each of a plurality of media streams;
extracting the plurality of audios and the mosaiced media stream from the audio integrated mosaiced media stream;
retrieving the plurality of video streams of each of the plurality of media streams by deconstructing the mosaiced media stream;
identifying a corresponding media stream from amongst the plurality of media streams, in response to receiving a user input; and
causing to render video stream and audio corresponding to the identified media stream on a display device coupled to a video display system.

12. The method according to claim 11, further comprising, based on a respective unique identifier, matching one of the audio from the plurality of extracted audios with a corresponding video stream from the plurality of retrieved video streams.

13. The method according to claim 11, wherein the encoded stream is received from a receiver system in communication with a media processing system, wherein the encoded stream was generated by the media processing system.

14. The method according to claim 11, wherein the encoded stream is received directly from a media processing system, wherein the encoded stream was generated by the media processing system.

15. The method according to claim 11, wherein the causing to render the media comprises:
transmitting each of the plurality of media stream to the video display system; and
rendering video stream and matching audio corresponding to each of the plurality of media stream in a two-dimensional grid on the display device coupled to the video display system.

16. A non-transitory computer-readable medium comprising computer-readable instructions, which when executed by a processor, causes a media gateway device to:
receive an encoded stream obtained by encoding an audio integrated mosaiced media stream;
decode the encoded stream to obtain the audio integrated mosaiced media stream, wherein the audio integrated mosaiced media stream comprises a plurality of media streams provided by respective users through their user devices;
in response to user authentication, identify a corresponding media stream from amongst the plurality of media streams;
filter the audio integrated mosaiced media stream to obtain the corresponding identified media stream from amongst the plurality of media streams; and
render video stream and matching audio corresponding to the identified media stream on a display device.

17. The non-transitory computer-readable medium according to claim 16, wherein the user authentication is based on one of a user name and a unique identifier.

18. The non-transitory computer-readable medium according to claim 17, wherein information for the user authentication is encoded in machine-readable encoded identifier.

* * * * *